(12) United States Patent
Omori

(10) Patent No.: US 8,730,500 B2
(45) Date of Patent: May 20, 2014

(54) IMAGE PROCESSING APPARATUS, IMAGE FORMING APPARATUS, IMAGE PROCESSING SYSTEM, IMAGE PROCESSING METHOD, IMAGE PROCESSING PROGRAM, AND STORAGE MEDIUM

(75) Inventor: Tetsuhiko Omori, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 464 days.

(21) Appl. No.: 13/041,692

(22) Filed: Mar. 7, 2011

(65) Prior Publication Data

US 2011/0228297 A1    Sep. 22, 2011

(30) Foreign Application Priority Data

Mar. 16, 2010  (JP) .................................. 2010-059938

(51) Int. Cl.
*G06F 15/00*   (2006.01)
*G06F 9/46*    (2006.01)

(52) U.S. Cl.
USPC ........................... 358/1.15; 358/1.9; 718/106

(58) Field of Classification Search
None
See application file for complete search history.

(56) References Cited

U.S. PATENT DOCUMENTS

| 2002/0138543 | A1* | 9/2002 | Teng et al. | 709/102 |
|---|---|---|---|---|
| 2005/0028073 | A1* | 2/2005 | Henry et al. | 715/500 |
| 2007/0106995 | A1* | 5/2007 | Osaka | 718/106 |
| 2008/0229306 | A1 | 9/2008 | Omori | |
| 2009/0158281 | A1 | 6/2009 | Omori | |

FOREIGN PATENT DOCUMENTS

| EP | 1 785 887 A2 | 5/2007 |
|---|---|---|
| GB | 2 404 470 A | 2/2005 |
| JP | 2006-18640 | 1/2006 |
| JP | 2009-44723 | 2/2009 |
| JP | 2009-253871 A | 10/2009 |

OTHER PUBLICATIONS

The Extended European Search Report issued May 3, 2012, in Application No./Patent No. 11250316.4-1228/2367347.
Office Action mailed on Feb. 18, 2014, in counterpart Japanese Appln No. 2010-059938 (1 page).

* cited by examiner

*Primary Examiner* — King Poon
*Assistant Examiner* — Temitayo Folayan
(74) *Attorney, Agent, or Firm* — Oblon, Spivak, McClelland, Maier & Neustadt, L.L.P.

(57) ABSTRACT

A communication unit acquires image data. A flow control unit controls execution of a workflow in which optional processing on the image data and check processing are combined. A determining unit determines whether user confirmation is needed for a result of check target processing included in the check processing according to the workflow. A notification unit notifies a user of confirmation of the result when it is determined that the user confirmation is needed. A receiving unit receives a modification input of the result of the check target processing from the user. A modification unit modifies the image data according to the modification input when the receiving unit receives the modification input, while the unit modifies the image data corresponding to the check target processing when it is determined that the user confirmation is not needed.

15 Claims, 12 Drawing Sheets

FIG. 3
WORKFLOW 1
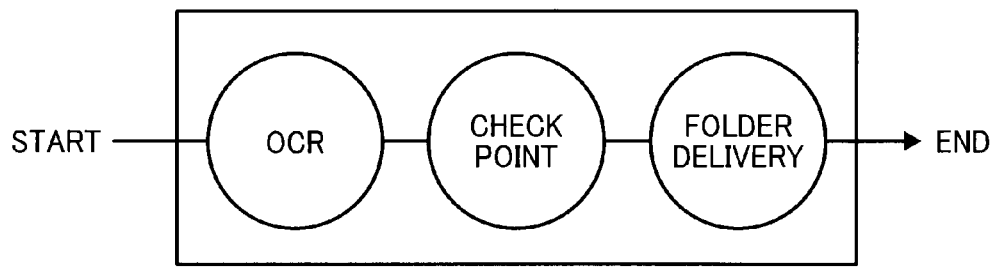
WORKFLOW 2
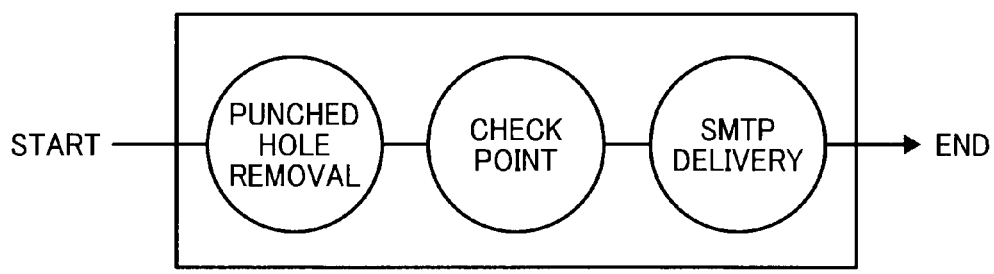
WORKFLOW 3
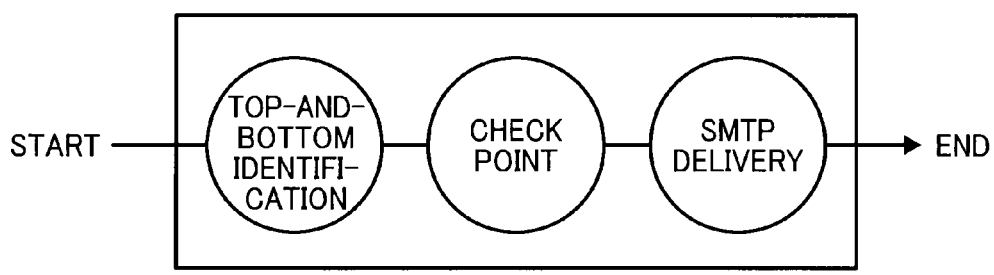

FIG. 6

| CHECK TARGET PROCESSING | NECESSITY OF USER CONFIRMATION ON PROCESSING RESULT |
|---|---|
| OCR | NECESSARY |
| PUNCHED HOLE REMOVAL | NECESSARY |
| BLANK SHEET REMOVAL | UNNECESSARY |
| TOP-AND-BOTTOM IDENTIFICATION | NECESSARY |
| NOISE REMOVAL | UNNECESSARY |
| ROTATION | UNNECESSARY |

FIG. 7

| CHECK TARGET PROCESSING | CONFIRMATION APPARATUS INFORMATION |
|---|---|
| OCR | MULTIFUNCTION PERIPHERAL PC |
| PUNCHED HOLE REMOVAL | PC |
| BLANK SHEET REMOVAL | PC |
| TOP-AND-BOTTOM IDENTIFICATION | PC |
| NOISE REMOVAL | PC |
| ROTATION | PC |
| RE-SCANNING DOCUMENT | MULTIFUNCTION PERIPHERAL |
| ADDING IMAGE | MULTIFUNCTION PERIPHERAL |

FIG. 8

OCR RESULT

CONFIRM RESULT AND MODIFY IT IF NEEDED

DOCUMENT TITLE: ORDER SHEET

ORDER ORIGIN: XYZ COMPANY, LTD.

DOCUMENT NUMBER: ABC-123456

[CONTINUE PROCESSING]  [DISCONTINUE PROCESSING]

| CHECK TARGET PROCESSING | MODIFICATION METHOD |
|---|---|
| NOISE REMOVAL | EXECUTE 3 TIMES |

IMAGE PROCESSING APPARATUS, IMAGE FORMING APPARATUS, IMAGE PROCESSING SYSTEM, IMAGE PROCESSING METHOD, IMAGE PROCESSING PROGRAM, AND STORAGE MEDIUM

CROSS-REFERENCE TO RELATED APPLICATIONS

The present application claims priority to and incorporates by reference the entire contents of Japanese Patent Application No. 2010-059938 filed in Japan on Mar. 16, 2010.

BACKGROUND OF THE INVENTION

1. Field of the Invention

The present invention relates to an image processing apparatus, an image forming apparatus, an image processing system, an image processing method, an image processing program, and a storage medium.

2. Description of the Related Art

A technique has been known to deliver image data externally by executing a workflow in which, for example, input processing, conversion processing, and output processing on the image data are optionally combined. For example, refer to Japanese Patent Application Laid-open No. 2009-044723. Such technique can enhance user-friendliness because various kinds of processing combined in a workflow are automatically executed as a series of processing.

In the above-described related art, however, it is not always true that the result of processing of the process that is combined as a workflow is the same as what a user intends to obtain. Image data different from the intention of the user may be generated.

SUMMARY OF THE INVENTION

It is an object of the present invention to at least partially solve the problems in the conventional technology.

According to an aspect of the present invention, an image processing apparatus includes: an acquiring unit that acquires image data; a workflow control unit that controls execution of a workflow in which optional processing on the image data and check processing are combined; a determining unit that determines whether user confirmation is needed for a result of check target processing included in the check processing, according to the workflow; a notification unit that notifies a user of confirmation of the result when it is determined that the user confirmation is needed; a receiving unit that receives a modification input of the result from the user; and a modification unit that modifies the image data according to the modification input when the modification input is received and modifies the image data corresponding to the check target processing when it is determined that the user confirmation is not needed.

According to another aspect of the present invention, an image forming apparatus includes: an image generation unit that reads an image so as to generate image data; a workflow control unit that controls execution of a workflow in which optional processing on the image data and check processing are combined; a determining unit that determines whether user confirmation is needed for a result of check target processing included in the check processing, according to the workflow; a notification unit that notifies a user of confirmation of the result when it is determined that the user confirmation is needed; a receiving unit that receives a modification input of the result from the user; and a modification unit that modifies the image data according to the modification input when the modification input is received and modifies the image data corresponding to the check target processing when it is determined that the user confirmation is not needed.

According to still another aspect of the present invention, an image processing system includes: an image forming apparatus; and an image processing apparatus connected with the image forming apparatus through a network, and the image forming apparatus includes an image generation unit that reads an image so as to generate image data, and the image processing apparatus includes: an acquiring unit that acquires the image data; a workflow control unit that controls execution of a workflow in which optional processing on the image data and check processing are combined; a determining unit that determines whether user confirmation is needed for a result of check target processing included in the check processing in accordance with the workflow; a notification unit that notifies a user of confirmation of the result when it is determined that the user confirmation is needed; a receiving unit that receives a modification input of the result from the user; and a modification unit that modifies the image data according to the modification input when the modification input is received and modifies the image data corresponding to the check target processing when it is determined that the user confirmation is not needed.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating workflow examples;

FIG. 6 is a diagram illustrating an example of a confirmation table;

FIG. 7 is a diagram illustrating an example of a confirmation apparatus table;

FIG. 8 is a diagram illustrating an example of a confirmation screen of an OCR result;

DETAILED DESCRIPTION OF THE PREFERRED EMBODIMENTS

Embodiments of an image processing apparatus, an image forming apparatus, an image processing system, an image processing method, an image processing program, and a storage medium according to the present invention are described in detail below with reference to the accompanying drawings. In the following embodiments, a multifunction peripheral (MFP) that includes at least one of a copying function, a facsimile function, and a printing function in addition to a scanning function is described as an example of the image forming apparatus. The image forming apparatus, however, is not limited to the MFP. Any image forming apparatuses may be applicable as long as they can receive image data by scanning. Such image forming apparatuses include scanning devices, coping machines, and facsimiles.

First Embodiment

First, a structure of an image processing system according to a first embodiment is described.

Figure 1:
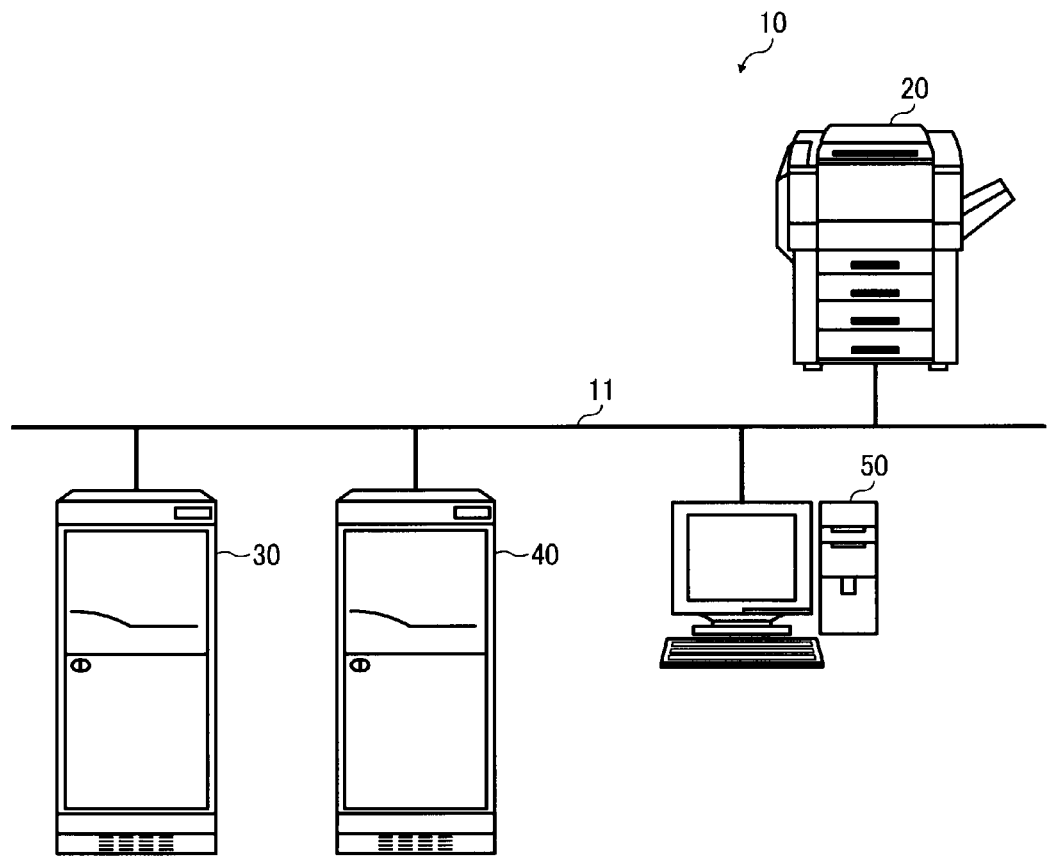
FIG. 1 is a schematic illustrating an exemplary structure of an image processing system of a first embodiment.

FIG. 1 is a schematic illustrating an exemplary rough structure of an image processing system 10 of the first embodiment. As illustrated in FIG. 1, the image processing system 10 includes an MFP 20, an image processing server 30 (an example of the image processing apparatus), an image control server 40, and a personal computer (PC) 50 (an example of an information processing apparatus). The components of the image processing system 10 are connected each other through a network 11, such as a local area network (LAN) and a public line. In the first embodiment, the image processing system includes one MFP and one PC as an example for description. However, the number of MFPs or PCs is not limited to one. A plurality of MFPs or PCs may be included in the image processing system.

The MFP 20 includes a scanning function, a copying function, a facsimile function, and a printing function. The MFP 20, for example, scans a paper medium such as an original by the scanning function so as to generate image data, and transmits the generated image data to the image processing server 30. The detail of the MFP 20 will be described later.

The image processing server 30 executes a workflow in which optional processing on image data and check processing are combined, and can be realized, for example, with a computer such as a work station. The image processing server 30, for example, acquires image data input to the MFP 20, and carries out conversion processing on the acquired image data, carries out check processing, and outputs the resulting image data according to a workflow. The detail of the image processing server 30 will be described later.

The image control server 40 accumulates therein the image data output from the image processing server 30, and may be realized, for example, with a computer such as a work station. The image control server 40 also can register the accumulated image data with an image type or search the accumulated image data.

The PC 50 is a terminal apparatus that administrators or users use to confirm or modify a processing result of a workflow, for example.

Figure 2:
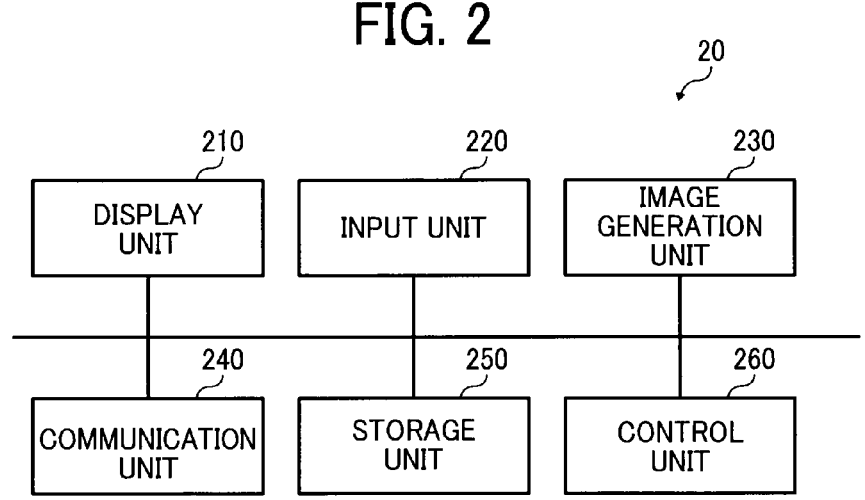
FIG. 2 is a block diagram illustrating an exemplary functional structure of a multifunction peripheral (MFP) of the first embodiment.

FIG. 2 is a block diagram illustrating an exemplary functional structure of the MFP 20 of the first embodiment. As illustrated in FIG. 2, the MFP 20 includes a display unit 210, an input unit 220, an image generation unit 230, a communication unit 240, a storage unit 250, and a control unit 260. In FIG. 2, functional units relating to the copying function, the facsimile function, and the printing function are omitted from the illustration.

The display unit 210 is configured to display various screens, and may be realized with an existing display, such as a touch-panel display and a liquid crystal display.

The input unit 220 is configured to perform input operation in various operations, and may be realized with an existing input device, such as a key switch and a touch panel. The display unit 210 and the input unit 220 may be integrally structured as a touch-panel display (operation panel), for example.

The image generation unit 230 is configured to generate image data by scanning a paper medium such as an original, and may be realized with an existing reading apparatus, such as a scanning device.

The communication unit 240 communicates with an external apparatus such as the image processing server 30 through the network 11, and may be realized with an existing communication device, such as a communication interface.

The storage unit 250 stores therein various kinds of programs executed by the MFP 20 and various kinds of information used for various kinds of processing carried out by the MFP 20. The storage unit 250 may be realized with an existing storage device capable of magnetically, optically or electrically storing data. The examples of the storage device include a hard disk drive (HDD), a solid state drive (SDD), a memory card, an optical disk, a read only memory (ROM), and a random access memory (RAM).

The control unit 260 is configured to control each unit of the MFP 20, and may be realized with an existing controller, such as a central processing unit (CPU). The control unit 260 controls each unit of the MFP 20 so as to select a workflow executed by the image processing server 30 or transmit image date generated by the image generation unit 230 to the image processing server 30 through the communication unit 240.

The term workflow here means a processing flow in which optional processing on image data and check processing are combined. The optional processing on image data includes input processing, conversion processing, and output processing on image data, for example. The input processing, the conversion processing, and the output processing may be realized with plug-ins, for example. Examples of the plug-in for the input processing include plug-ins for scanning input processing and FAX receiving processing. Examples of the plug-in for the conversion processing include plug-ins for OCR (optical character reader) processing, punched hole removal processing, top-and-bottom identification processing, language conversion processing, PDF (portable document format) conversion processing, and JPEG (joint photographic experts group) format conversion processing. Examples of the plug-in for the output processing include plug-ins for mail transmission processing, e.g., SMTP (simple mail transfer protocol), and folder delivery processing.

FIG. 3 is a diagram illustrating examples of the workflow. A workflow 1 illustrates a workflow in which image data is subjected to the OCR processing, the result of the OCR processing is checked at a check point (CP), and the resulting data is subjected to the folder delivery processing. A workflow 2 illustrates a workflow in which image data is subjected to the punched hole removal processing, the result of the punched hole removal processing is checked at a check point (CP), and the resulting data is delivered by SMTP. A workflow 3 illustrates a workflow in which image data is subjected to the top-and-bottom identification processing, the result of the top-and-bottom identification processing is checked at a check point (CP), and the resulting data is delivered by SMTP. The image data subjected to processing in a workflow may be image data acquired from the MFP 20, or image data or electronic data stored in the image control server 40.

Figure 4:
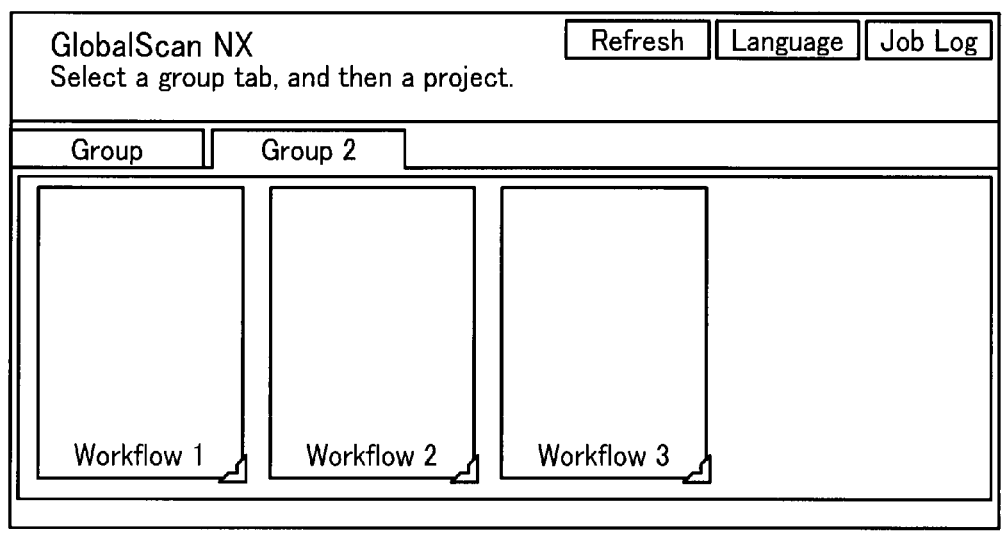
FIG. 4 is a diagram illustrating an example of a workflow selection screen.

Upon receiving UI information of the workflow selection screen from the image processing server 30 through the communication unit 240, the control unit 260 causes the display unit 210 to display a workflow selection screen. Upon receiving the selection input for selecting a workflow from the input unit 220, the control unit 260 transmits the selection input to the image processing server 30 through the communication unit 240. As a result, the workflow designated by the selection input received by the control unit 260 is selected. FIG. 4 illustrates an example of the workflow selection screen. In the example illustrated in FIG. 4, the workflow selection screen for selecting any one of the workflows 1 to 3 described in FIG. 3 is displayed on the display unit 210. In this case, when a selection input for selecting any one of the workflow 1 to 3 is input from the input unit 220, the workflow designated by the selection input is selected.

When the image generation unit 230 generates image data, the control unit 260 transmits the generated image data to the image processing server 30 through the communication unit 240. The control unit 260 may transmit the image data attached with electronic data identification information to the image processing server 30. The electronic data identification information identifies electronic data delivered together with the image data according to the workflow. The electronic data identification information can be input from the input unit 220. The control unit 260 also may be configured to transmit the image data attached with bibliographic information to the image processing server 30. The bibliographic information includes an image format and image size for image conversion processing, and a mail address for output processing. The bibliographic information can be input from the input unit 220. Hereinafter, the bibliographic information for delivery processing and the electronic data identification information are referred to as deliver setting information.

Not all of the above described units are indispensable for the MFP 20, but some of the units may be omitted.

Figure 5:
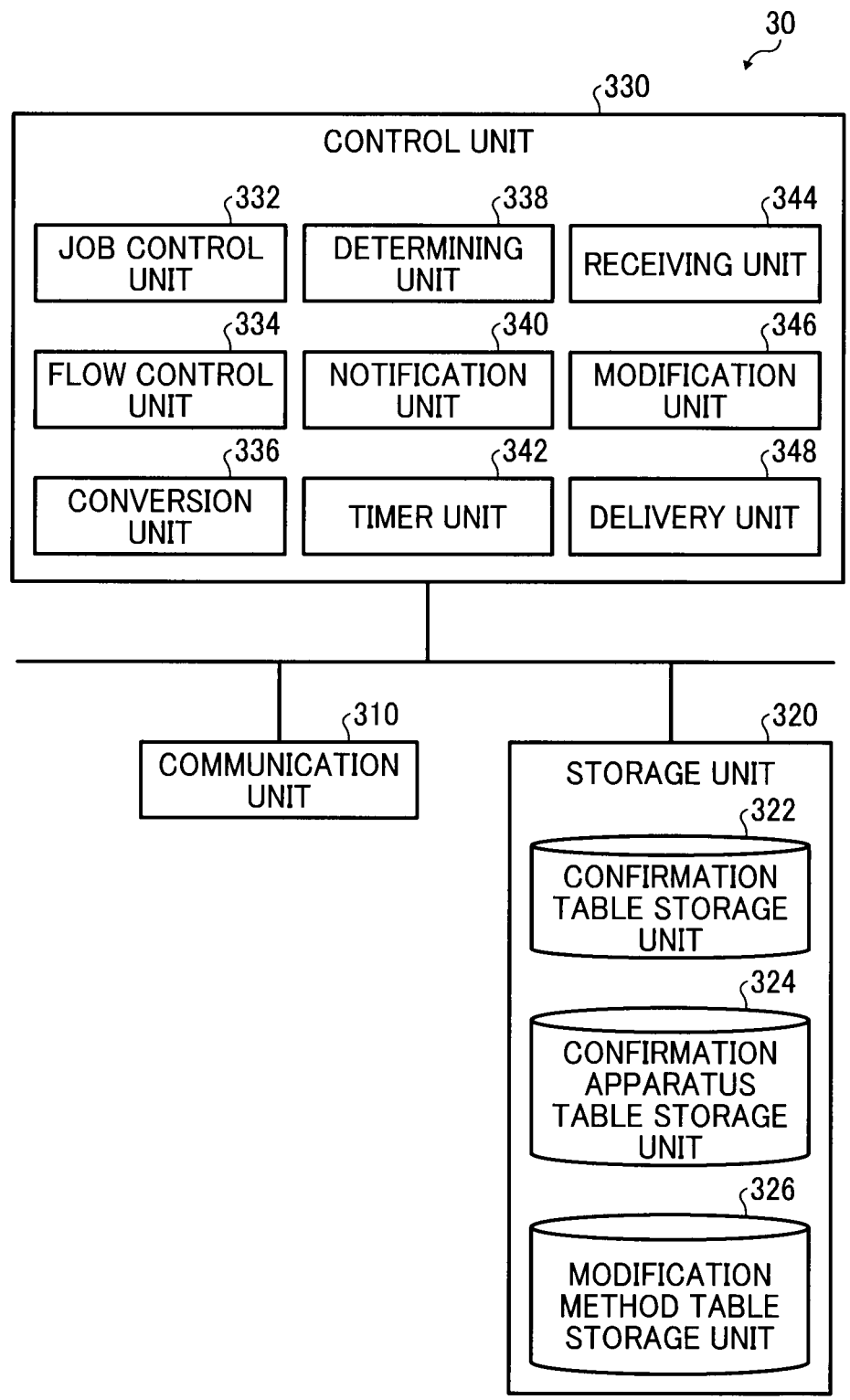
FIG. 5 is a block diagram illustrating an exemplary functional structure of an image processing server of the first embodiment.

FIG. 5 is a block diagram illustrating an exemplary functional structure of the image processing server 30 of the first embodiment. As illustrated in FIG. 5, the image processing server 30 includes a communication unit 310, a storage unit 320, and a control unit 330.

The communication unit 310 (an example of an acquiring unit) communicates with external apparatuses including the MFP 20, the image control server 40, and the PC 50 through the network 11, and may be realized with an existing communication device in the same manner as the MFP 20. The communication unit 310, for example, transmits UI information including a workflow selection screen to the MFP 20 when receiving an instruction from the control unit 330 (details are described later), or receives from the MFP 20 information of a workflow designated by a selection input, and image data and delivery setting information that are input to the MFP 20.

The storage unit 320 stores therein various kinds of programs executed by the image processing server 30 and various kinds of information used for various kinds of processing carried out by the image processing server 30, and may be realized with an existing storage device in the same manner as the MFP 20. The storage unit 320 stores therein, for example, various kinds of plug-ins including the plug-ins for conversion processing and output processing, a workflow, UI information including a workflow selection screen displayed by the MFP 20, information of a workflow selected by the MFP 20, and image data and delivery setting information (jobs) that are transmitted from the MFP 20. The storage unit 320 includes a confirmation table storage unit 322, a confirmation apparatus table storage unit 324, and a modification method table storage unit 326. Details of these storage units will described later.

The control unit 330 is configured to control each unit of the image processing server 30, and may be realized with an existing controller in the same manner of the MFP 20. The control unit 330 includes a job control unit 332, a flow control unit 334, a conversion unit 336, a determining unit 338, a notification unit 340, a timer unit 342, a receiving unit 344, a modification unit 346, and a delivery unit 348.

The job control unit 332 stores, in the storage unit 320 as a job, image data and delivery setting information that the communication unit 310 receives from the MFP 20; and the job control unit 332 makes a request to the flow control unit 334 (described later) to process the job. The job control unit 332 may acquire image data and electronic data that are stored in the image control server 40, store the acquired data in the storage unit 320 as a job, and request the flow control unit 334 to process the job, depending on a selected workflow.

The flow control unit 334 receives a job processing request from the job control unit 332, and controls execution of a workflow. Specifically, the flow control unit 334 controls execution of various kinds of processing included in a workflow by controlling the conversion unit 336, the determining unit 338, the notification unit 340, the timer unit 342, the receiving unit 344, the modification unit 346, and the delivery unit 348. For example, the flow control unit 334 controls execution of conversion processing included in a workflow by controlling the conversion unit 336. For another example, the flow control unit 334 controls execution of check processing included in a workflow by controlling the determining unit 338, the notification unit 340, the timer unit 342, the receiving unit 344, and the modification unit 346. For another example, the flow control unit 334 controls execution of output processing included in a workflow by controlling the delivery unit 348. The conversion unit 336 is realized with a plug-in for conversion processing while the delivery unit 348 is realized with a plug-in for output processing.

The conversion unit 336 receives an instruction from the flow control unit 334, and carries out the conversion processing, such as the OCR processing, the punched hole removal processing, the top-and-bottom identification processing, the PDF conversion processing, and the JPEG format conversion processing, on image data.

The confirmation table storage unit 322 will be described below. The confirmation table storage unit 322 stores therein a confirmation table that associates check target processing included in the check processing with necessity of user confirmation on a result of the check target processing. FIG. 6 illustrates an example of the confirmation table. In the example illustrated in FIG. 6, the conversion processing is the check target processing, and user confirmation is needed for the OCR processing, the punched hole removal processing, and the top-and-bottom identification processing. The example illustrated in FIG. 6 exemplarily describes the conversion processing as the check target processing. However, the check target processing is not limited to this processing.

The determining unit 338 receives an instruction from the flow control unit 334, and determines whether user confirmation is needed for a result of the check target processing. Specifically, the determining unit 338 refers to the confirmation table so as to determine necessity of user confirmation on a result of the check target processing.

The confirmation apparatus table storage unit 324 will be described below. The confirmation apparatus table storage unit 324 stores therein a confirmation apparatus table that associates check target processing with confirmation apparatus information indicating the MFP 20 or the PC 50. FIG. 7 illustrates an example of the confirmation apparatus table. In the example illustrated in FIG. 7, the confirmation apparatus information of the OCR processing indicates the MFP 20 or the PC 50; the confirmation apparatus information, of the punched hole removal processing and the top-and-bottom identification processing, indicates the PC 50. The confirmation apparatus table illustrated in FIG. 7 sets an apparatus suitable for modifying a result of the check target processing to the confirmation apparatus information associated with the check target processing. For example, the PC 50 is set as the apparatus for modifying the result of the punched hole removal processing because the modification requires good operability while the MFP 20 is set as the suitable apparatus for re-scanning document processing because the processing is exclusively carried out by the MFP 20.

When the determining unit 338 determines that the user confirmation is needed, the notification unit 340 notifies a user of the confirmation on a result of the check target processing. In the notification, the notification unit 340 designates the MFP 20 or the PC 50 as a confirmation apparatus that confirms a result of the check target processing, and notifies a user of the confirmation. Specifically, the notification unit 340 designates, as the confirmation apparatus, an apparatus indicated by the confirmation apparatus information associated with the check target processing with reference to the confirmation table, and notifies a user of the confirmation on the result of the check target processing. The notification unit 340 uses e-mail, for example, as a notification method.

Figure 9:
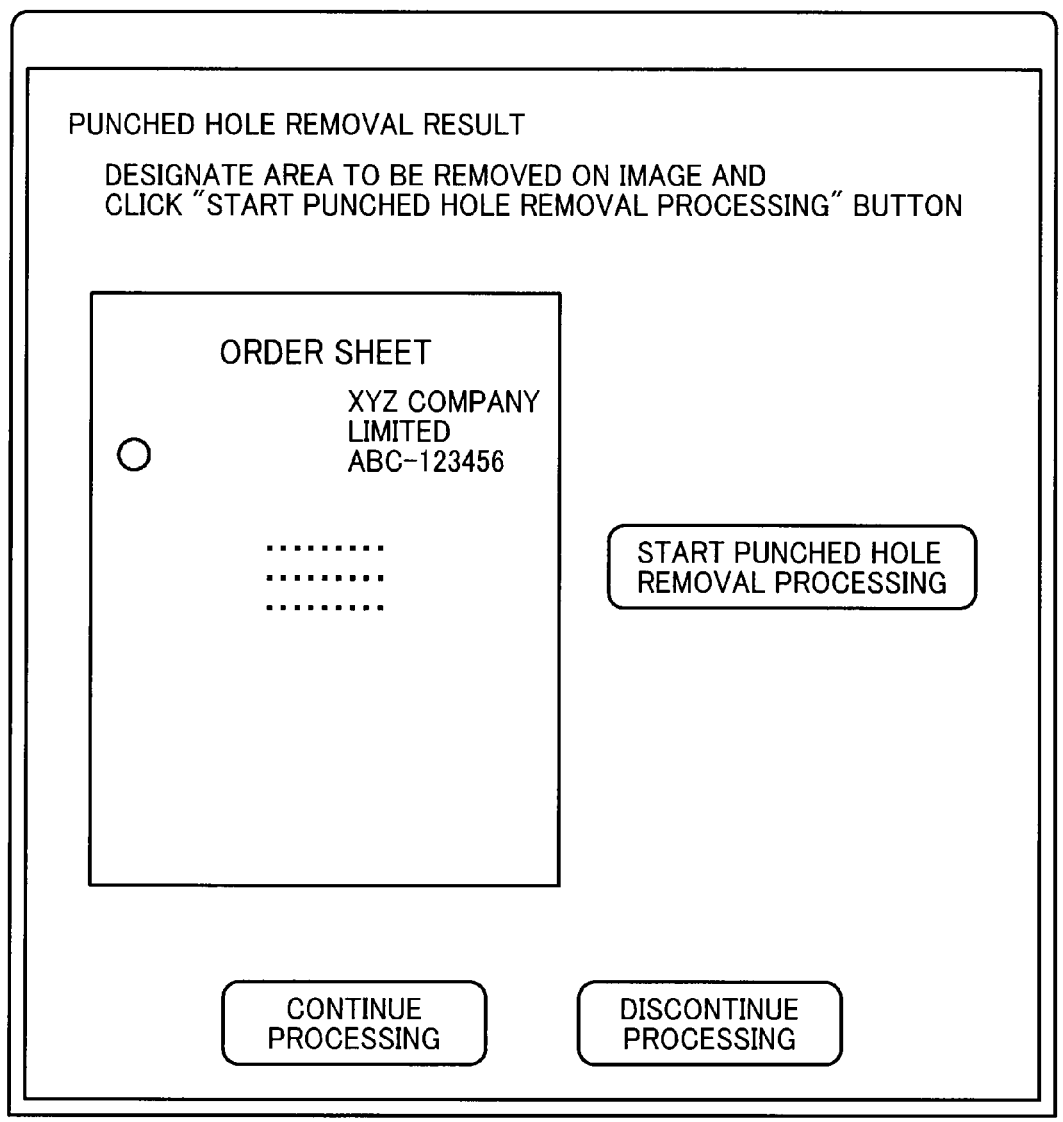
FIG. 9 is a diagram illustrating an example of a confirmation screen of a punched hole removal result.
Figures 10, 11:
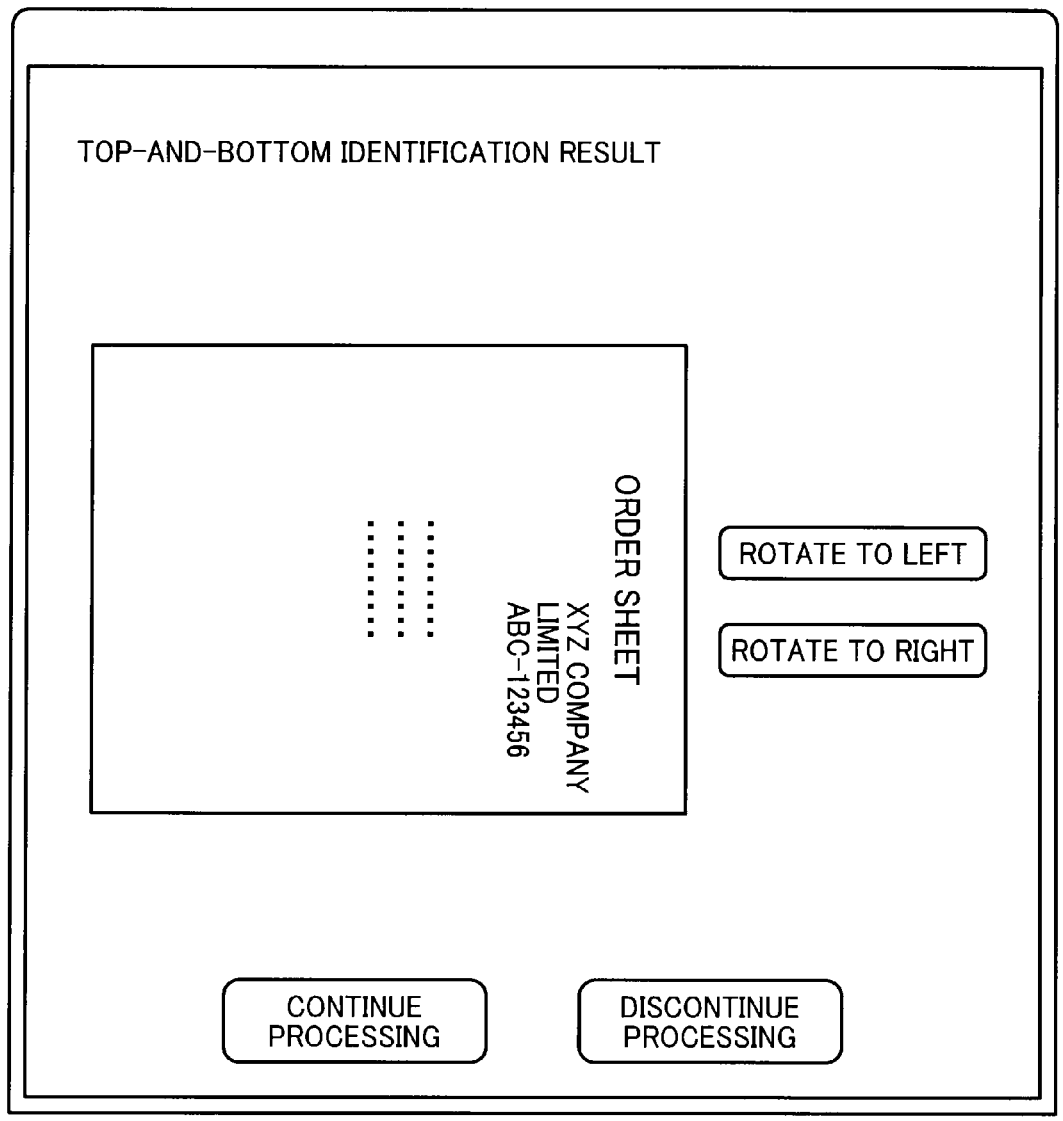
FIG. 10 is a diagram illustrating an example of a confirmation screen of a top-and-bottom identification result.
FIG. 11 is a diagram illustrating an example of a modification method table.

The e-mail notified by the notification unit 340 has a link to a result of the check target processing. For example, a user of the PC 50 can open a confirmation screen of the result of the check target processing by opening the link. FIG. 8 illustrates an example of a confirmation screen of an OCR result. FIG. 9 illustrates an example of a confirmation screen of a punched hole removal result. FIG. 10 illustrates an example of a top-and-bottom identification result.

The timer unit 342 counts elapsed time from when the notification unit 340 notifies a user of confirmation on a result of the check target processing.

The receiving unit 344 receives a modification input of the result of the check target processing from a user. Specifically, the receiving unit 344 receives a modification input of the result of the check target processing from the MFP 20 or the PC 50 that is designated as a confirmation apparatus. When a result of the check target processing is the OCR result illustrated in FIG. 8, the receiving unit 344 receives from the PC 50 a modification input in which the document title, the order origin, or the document number has been modified. When the result of the check target processing is the punched hole removal result illustrated in FIG. 9, the receiving unit 344 receives from the PC 50 a modification input for correcting an area from which a punched hole is removed. When a result of the check target processing is the top-and-bottom identification result illustrated in FIG. 10, the receiving unit 344 receives from the PC 50 a modification input for correcting the top-and bottom identification result.

The receiving unit 344 also receives a no-modification-required input indicating that no modification is needed on a result of the check target processing. When "discontinue processing" is input from the PC 50 in each example illustrated in FIGS. 8 to 10, the receiving unit 344 receives the no-modification-required input in each example.

The modification method table storage unit 326 will be described below. The modification method table storage unit 326 stores therein a modification method table that associates check target processing with a modification method. FIG. 11 illustrates an example of the modification method table. In the example illustrated in FIG. 11, execution of a modification method three times is associated with noise removing processing as an automatic modification method for removing noises.

When the determining unit 338 determines that user confirmation is not needed, the modification unit 346 carries out modification on image data corresponding to the check target processing. Specifically, when the determining unit 338 determines that user confirmation is not needed, the modification unit 346 carries out a modification method associated with check target processing on image data with reference to the modification table.

When the receiving unit 344 receives a modification input, the modification unit 346 carries out modification on image data according to the modification input.

The modification unit 346 discontinues modification of image data when the receiving unit 344 does not receive a modification input until elapsed time counted by the timer unit 342 exceeds a predetermined time period. The modification unit 346 also discontinues modification of image data when the receiving unit 344 receives a no-modification-required input.

The delivery unit 348 receives an instruction from the flow control unit 334 and delivers image data modified by the modification unit 346. The delivery unit 348 receives an instruction from the flow control unit 334 and delivers image data of which the modification has been discontinued by the modification unit 346. The delivery unit 348 requests a SMTP server (not illustrated) to process image data when delivering the image data by SMTP. The delivery unit 348 requests a file server (not illustrated) to process image data when delivering image data by folder delivery.

Not all of the above described units are indispensable for the image processing server 30, but some of the units may be omitted.

Next, an operation of the image processing system of the first embodiment will be described.

Figure 12:
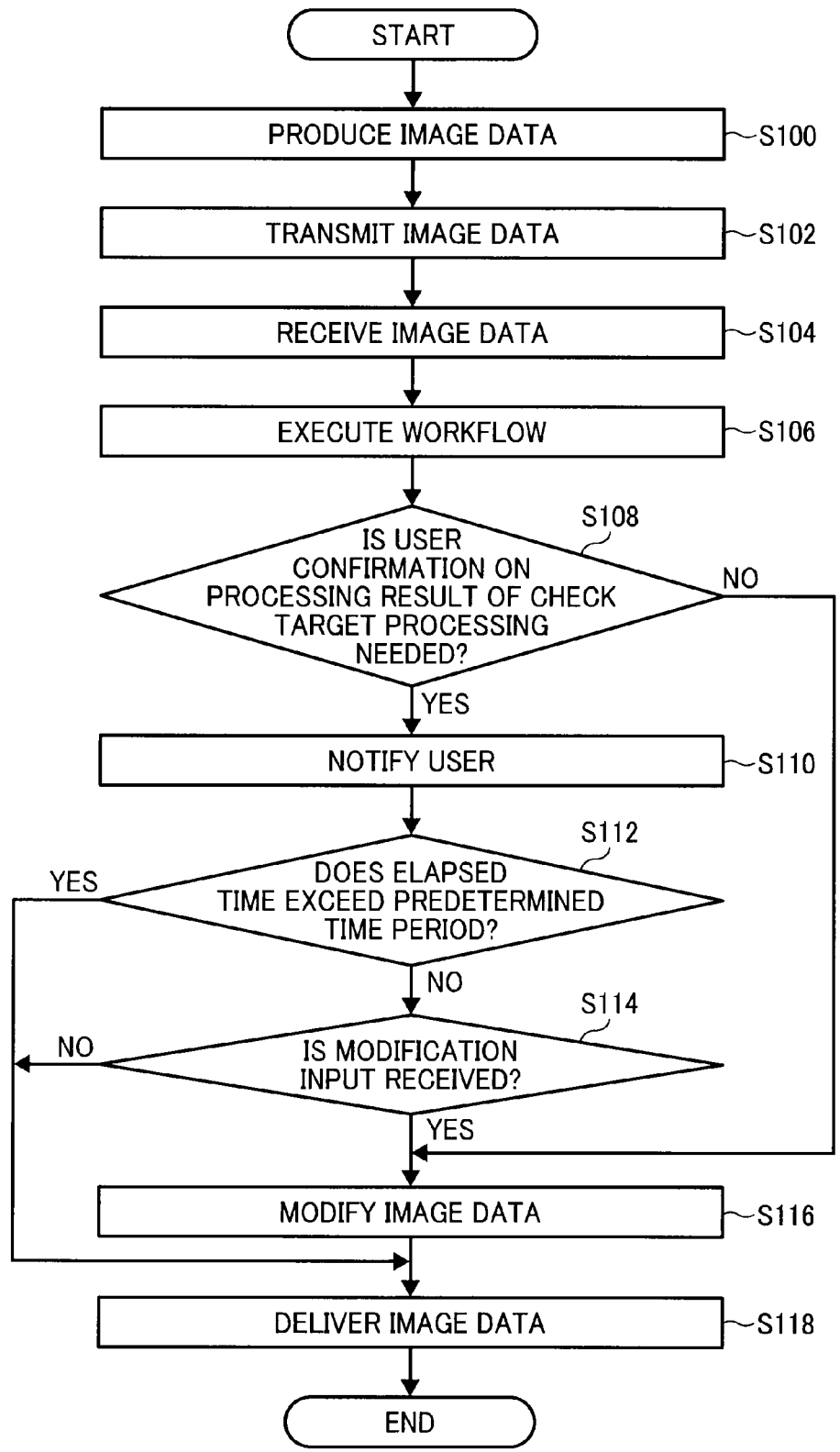
FIG. 12 is a flowchart illustrating a processing example of the image processing system of the first embodiment.

FIG. 12 is a flowchart illustrating an exemplary flow of processing procedures carried out by the image processing system 10 of the first embodiment.

At step S100, the image generation unit 230 reads out a paper medium such as an original and generates image data.

At step S102, the communication unit 240 transmits image data generated by the image generation unit 230 together with delivery setting information to the image processing server 30.

At step S104, the communication unit 310 receives the image data and the delivery setting information from the MFP 20.

At step S106, the flow control unit 334 controls execution of a workflow.

At step S108, the determining unit 338 receives an instruction from the flow control unit 334, and determines whether user confirmation is needed for a result of check target processing. If it is determined that user confirmation is needed (Yes at step S108), the flow proceeds to step S110 while if it is determined that user confirmation is not needed (No at step S108), the flow proceeds to step S116.

At step S110, the notification unit 340 notifies a user of the confirmation of the result of the check target processing.

At step S112, the modification unit 346 determines whether elapsed time counted by the timer unit 342 exceeds a predetermined time period. If the elapsed time exceeds the predetermined time period (Yes at step S112), the flow proceeds to step S118 while if it is determined that the elapsed time does not exceed the predetermined time period (No at step S112), the flow proceeds to step S114.

At step S114, if the receiving unit 344 receives a modification input of the result of the check target processing from the user (Yes at step S114), the flow proceeds to step S116 while if the receiving unit 344 receives a no-modification-required input (No at step S114), the flow proceeds to step S118.

At step S116, the modification unit 346 modifies the image data.

At step S118, the delivery unit 348 delivers the image data.

According to the first embodiment, as described above, a result of check target processing is automatically modified if the result can be automatically modified while if the result cannot be automatically modified, a user modifies the result, even when a workflow is executed. As a result, image data intended by the user can be generated.

In addition, in the first embodiment, when user modification is not carried out for a certain period of time, the modification is discontinued and subsequent processing continues. As a result, stagnation of job processing can be prevented.

Second Embodiment

In a second embodiment, an example is described in which an image processing server is built in an MFP. In the following descriptions, differences from the first embodiment are mainly described. The same name and reference numeral of the first embodiment is given to the element having the same function, and description thereof is omitted.

Figure 13:
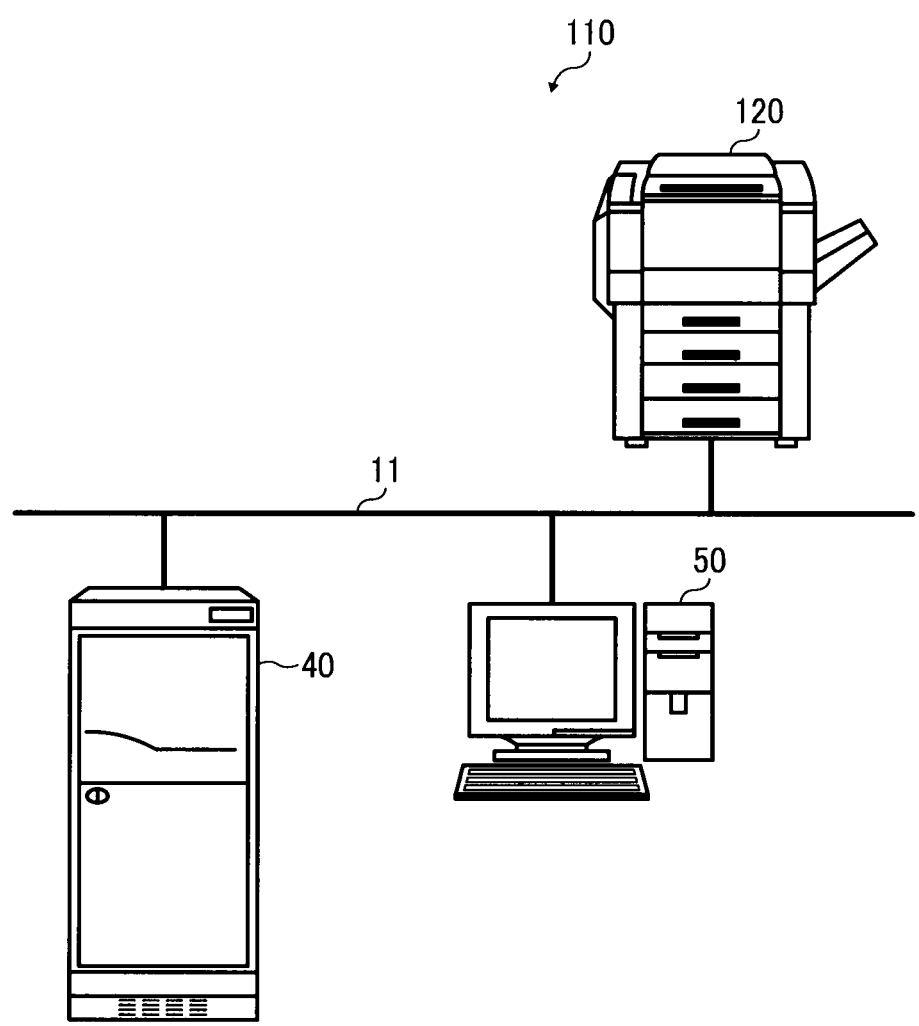
FIG. 13 is a schematic illustrating an exemplary structure of an image processing system of a second embodiment.
Figure 14:
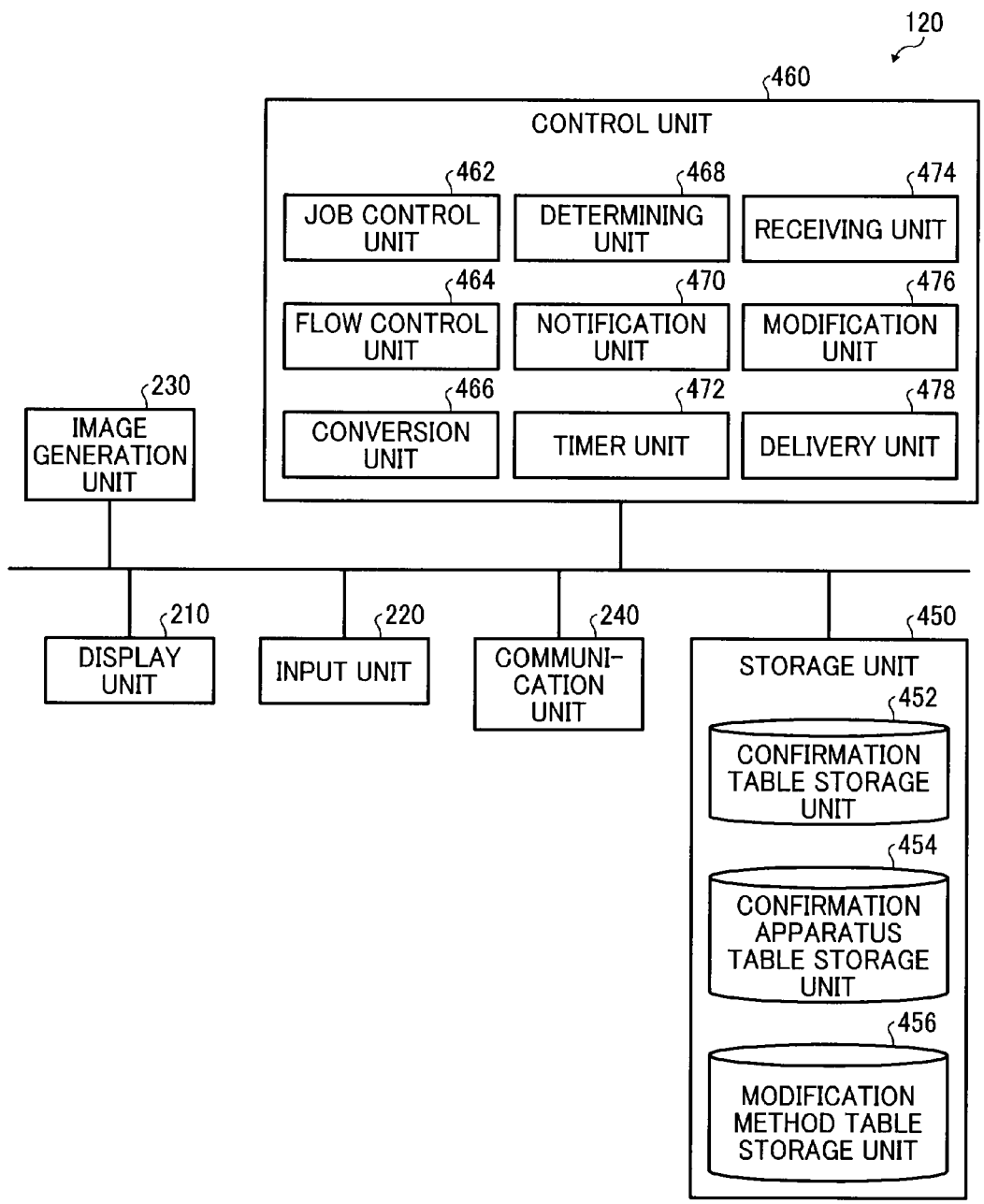
FIG. 14 is a block diagram illustrating an exemplary functional structure of an MFP of the second embodiment.

FIG. 13 is a schematic illustrating an exemplary rough structure of an image processing system 110 of the second embodiment. FIG. 14 is a block diagram illustrating an exemplary functional structure of an MFP 120 of the second embodiment. In the second embodiment, an image processing server is built in the MFP 120, and thus, the stand-alone image processing server is eliminated from the image processing system 110. The MFP 120 has basically the same functions as the MFP 20 and the image processing server 30 of the first embodiment. A confirmation table storage unit 452, a confirmation apparatus table storage unit 454, and a modification method table storage unit 456 that are included in a storage unit 450 of the MFP 120 respectively correspond to the confirmation table storage unit 322, the confirmation apparatus table storage unit 324, and the modification method table storage unit 326 of the image processing server 30. In addition, a job control unit 462, a flow control unit 464, a conversion unit 466, a determining unit 468, a notification unit 470, a timer unit 472, a receiving unit 474, a modification unit 476, and a delivery unit 478 that are included in a control unit 460 of the MFP 120 respectively correspond to the job control unit 332, the flow control unit 334, the conversion unit 336, the determining unit 338, the notification unit 340, the timer unit 342, the receiving unit 344, the modification unit 346, and the delivery unit 348.

Because of the structure, the MFP 120 according to the second embodiment can carry out alone the same processing as of the first embodiment.

Hardware Configuration

Exemplary hardware configurations of the image processing server 30 of the first embodiment, the image processing system 10 of the first embodiment, and the image processing system 110 of the second embodiment will be described.

The image processing server 30 of the first embodiment has a hardware configuration utilizing a normal computer. The image processing server 30 includes a controller such as a CPU, a storage device such as a ROM and a RAM, an external storage device such as an HDD and a removable drive, a display device such as a display, and an input device such as a keyboard and a mouse.

An image processing program executed by the image processing server 30 of the first embodiment is stored and provided in a computer-readable recording medium with a format installable in or a file having a format executable by the image processing server 30. The examples of the computer-readable recording medium include a CD-ROM, a CD-R, a memory card, a digital versatile disk (DVD) and a flexible disk (FD).

The image processing program executed by the image processing server 30 of the first embodiment may be stored in a computer connected to a network such as the Internet, and be provided by downloading the program through the network. The image processing program executed by the image processing server 30 of the first embodiment may be provided or delivered through a network such as the Internet. The image processing program executed by the image processing server 30 of the first embodiment may be provided with a ROM into which the program has been written in advance.

The image forming program executed by the image processing server 30 of the first embodiment has a module structure for realizing each of the units described above in a computer. In practical hardware, the CPU reads out the image processing program from the HDD to the RAM so as to execute the program, so that each unit described above may be realized in the computer.

Figure 15:
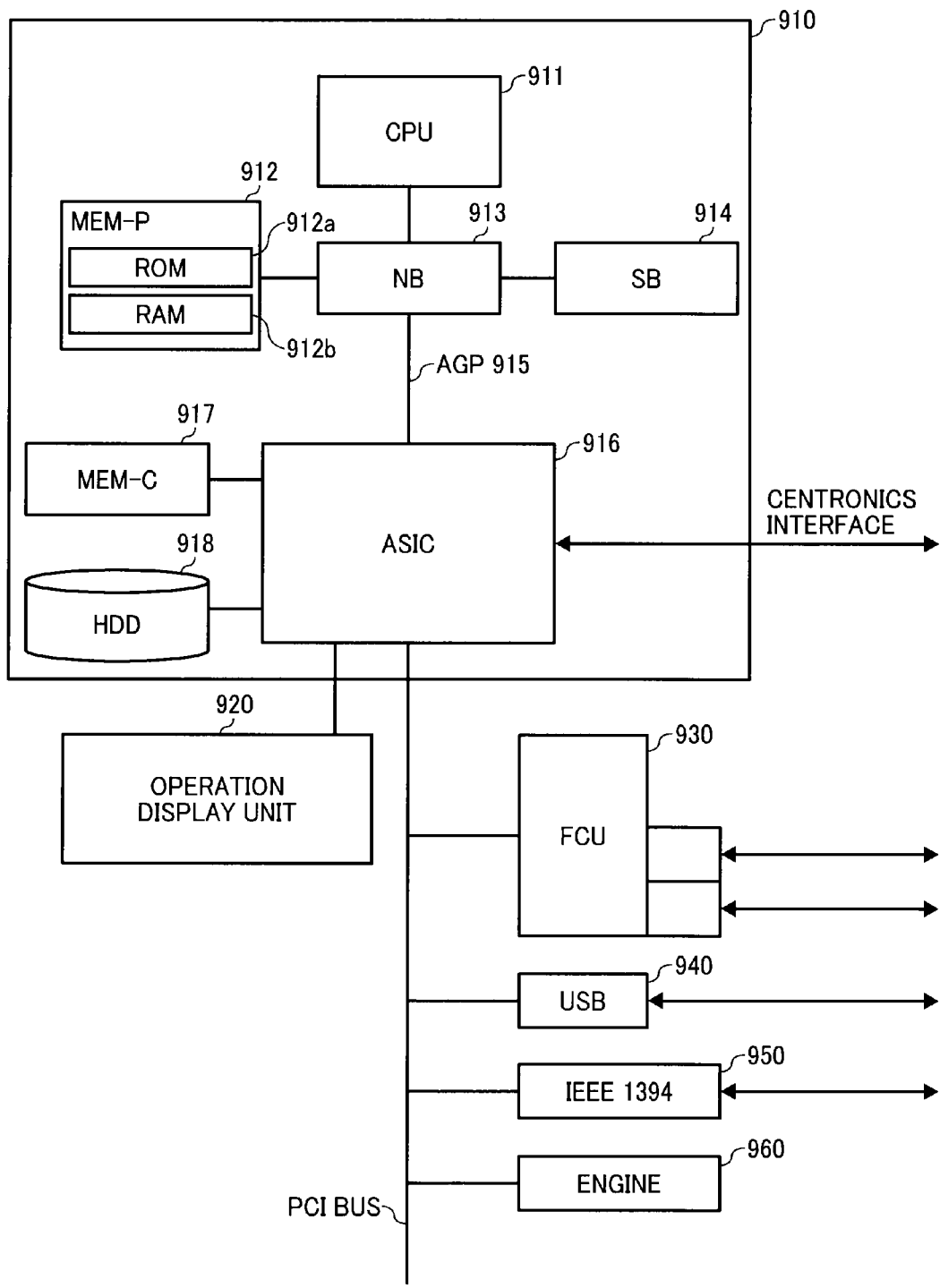
FIG. 15 is a block diagram illustrating an example of hardware configurations of the MFPs of the first and the second embodiments.

FIG. 15 is a block diagram illustrating an example of hardware configurations of the image processing system 10 of the first embodiment, and the image processing system 110 of the second embodiment.

As illustrated in FIG. 15, the image processing system 10 of the first embodiment and the image processing system 110 of the second embodiment each has a configuration in which a controller 910 and an engine unit 960 are connected through a peripheral component interconnect (PCI) bus. The controller 910 controls the whole of the MFP, drawing, communications, and inputs from an operation display unit 920. The engine unit 960 is a printer engine that is connectable with the PCI bus. Examples of the engine unit 960 include a monochrome plotter, a single-drum color plotter, a four-drum color plotter, a scanning device and a facsimile unit. The engine unit 960 includes an image processing unit for error diffusion and gamma conversion in addition to the known engine unit such as the plotter.

The controller 910 includes a CPU 911, a north bridge (NB) 913, a system memory (MEM-P) 912, a south bridge (SB) 914, a local memory (MEM-C) 917, an application specific integrated circuit (ASIC) 916, and a hard disk drive (HDD) 918. The north bridge (NB) 913 and the ASIC 916 are connected through an accelerated graphics port (AGP) 915. The MEM-P 912 includes a ROM 912a and a RAM 912b.

The CPU 911 controls the whole of the MFP, and includes a chipset composed of the NB 913, the MEM-P 912, and the SB 914. The MFP is connected with other instruments through the chip set.

The NB 913 is a bridge for connecting the CPU 911 with the MEM-P 912, the SB 914, and the AGP 915. The NB 913 includes a memory controller for controlling writing to the MEM-P 912, a PCI master, and an AGP target.

The MEM-P 912 is a system memory used for a storage memory of programs and data, a development memory of programs and data, and a drawing memory of a printer, for example. The MEM-P 912 is composed of the ROM 912a and the RAM 912b. The ROM 912a is a read only memory used for a storage memory of programs and data. The RAM 912b is a writable and readable memory used for a development memory of programs and data and a drawing memory of a printer.

The SB 914 is a bridge for connecting the NB 913 with PCI devices and peripheral devices. The SB 914 and the NB 913 are connected through the PCI bus, with which a network interface (I/F) unit, for example, is connected.

The ASIC 916 is an integrated circuit (IC) for image processing and includes hardware for image processing. The ASIC 916 serves as a bridge for connecting the AGP 915, the PCI bus, the HDD 918, and the MEM-C 917. The ASIC 916 includes the PCI target, the AGP master, an arbiter (ARB) that is the core of the ASIC 916, a memory controller that controls the MEM-C 917, a plurality of direct memory access controllers (DMACs) that carry out image data rotation with hardware logics, and a PCI unit that carries out data transfer between itself and the engine unit 960 through the PCI bus. The ASIC 916 is connected with a fax control unit (FCU) 930, a universal serial bus (USB) 940, and the Institute of Electrical and an Electronics Engineers 1394 (IEEE1394) interface 950 through the PCI bus. The operation display unit 920 is directly connected to the ASIC 916.

The MEM-C 917 is a local memory used for a copying image buffer and a code buffer. The HDD 918 is a storage for storing image data, programs, font data, and forms.

The AGP 915 is a bus interface for a graphic accelerator card and proposed to carry out graphic processing at high speed. The AGP 915 allows a graphic accelerator card to operate at high speed with direct access to the MEM-P 912 with a high throughput.

The image processing programs executed by the image processing system 10 of the first embodiment and the image processing system 110 of the second embodiment are previously written into, for example, a ROM and provided.

The image processing programs executed by the image processing system 10 of the first embodiment and the image processing system 110 of the second embodiment may be recorded into a storage medium readable by a computer with a format installable in or a file executable by the computer, and provided. The examples of the storage medium include a CD-ROM, a flexible disk (FD), a CD-R, and a digital versatile disk (DVD).

The image processing programs executed by the image processing system 10 of the first embodiment and the image processing system 110 of the second embodiment may be stored in a computer connected to a network such as the Internet, and be provided by downloading the programs through the network. The image processing programs executed by the image processing system 10 of the first embodiment and the image processing system 110 of the second embodiment may be provided or delivered through a network such as the Internet.

The image forming programs executed by the image processing system 10 of the first embodiment and the image processing system 110 of the second embodiment each has a module structure for realizing each of the units described above in a computer. In practical hardware, the CPU 911 reads out the image processing program from the ROM 912a to the RAM 912b so as to execute the program, so that each unit described above may be realized in the computer.

Modified Examples

The present invention is not directly limited to the above embodiments. The present invention may be embodied by changing components without departing from the spirit and scope of the present invention when practiced. In addition, various aspects of the present invention can be made by properly combining the components of the above embodiments. For example, some components may be eliminated from all of the components of the above embodiments. Furthermore, the components of different embodiments may be properly combined.

For example, in the above embodiments, user confirmation may be carried out on an automatic modification result. For another example, when modification of a result of check target processing is carried out by the MFP, authentication may be requested in the same manner as in image data reading. This process can secure confidentiality even when image data of a document having high confidentiality is modified. Furthermore, jobs in a state of waiting for user confirmation may be combined.

The present invention exhibits the effect of producing image data that a user intends to obtain even when a workflow is executed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus, comprising:
   an acquiring unit that acquires image data;
   a workflow control unit that controls execution of a workflow in which optional processing on the image data and check processing are combined;
   a determining unit that determines whether user confirmation is needed for a result of check target processing included in the check processing, according to the workflow;
   a notification unit that notifies a user of confirmation of the result when it is determined that the user confirmation is needed;
   a receiving unit that receives a modification input of the result from the user;
   a modification unit that modifies the image data according to the modification input when the modification input is received and modifies the image data corresponding to the check target processing when it is determined that the user confirmation is not needed; and
   a confirmation apparatus table storage unit that stores therein a confirmation apparatus table that associates the check target processing with confirmation apparatus information indicating an image forming apparatus or an information processing apparatus to execute the check target processing, wherein
   the notification unit designates, as a confirmation apparatus, the image forming apparatus or the information processing apparatus that is indicated by the confirmation apparatus information associated with the check target processing with reference to the confirmation apparatus table, and notifies the user of confirmation of the result.

2. The image processing apparatus according to claim 1, further comprising a confirmation table storage unit that stores therein a confirmation table that associates the check target processing with necessity of the user confirmation, wherein
the determining unit determines whether the user confirmation is needed with reference to the confirmation table.

3. The image processing apparatus according to claim 1, further comprising a modification method table storage unit that stores therein a modification method table that associates the check target processing with a modification method, wherein
the modification unit modifies the image data with the modification method associated with the check target processing with reference to the modification method table when it is determined that the user confirmation is not needed.

4. The image processing apparatus according to claim 1, wherein:
the receiving unit receives the modification input from the image forming apparatus or the information processing apparatus that has been designated as the confirmation apparatus.

5. The image processing apparatus according to claim 1, further comprising a delivery unit that delivers the image data modified according to the workflow.

6. The image processing apparatus according to claim 5, further comprising a timer unit that counts elapsed time from when the confirmation of the result is notified, wherein
the modification unit discontinues modification of the image data if the receiving unit does not receive the modification input until the elapsed time exceeds a predetermined time period, and
the delivery unit delivers the image data of which the modification has been discontinued according to the workflow.

7. The image processing apparatus according to claim 5, wherein:
the receiving unit receives from the user a no-modification-required input indicating that modification of the result is not needed;
the modification unit discontinues modification of the image data when the receiving unit receives the no-modification-required input; and
the delivery unit delivers the image data of which the modification has been discontinued according to the workflow.

8. An image forming apparatus, comprising:
an image generation unit that reads an image so as to generate image data;
a workflow control unit that controls execution of a workflow in which optional processing on the image data and check processing are combined;
a determining unit that determines whether user confirmation is needed for a result of check target processing included in the check processing, according to the workflow;
a notification unit that notifies a user of confirmation of the result when it is determined that the user confirmation is needed;
a receiving unit that receives a modification input of the result from the user;
a modification unit that modifies the image data according to the modification input when the modification input is received and modifies the image data corresponding to the check target processing when it is determined that the user confirmation is not needed; and
a confirmation apparatus table storage unit that stores therein a confirmation apparatus table that associates the check target processing with confirmation apparatus information indicating an image forming apparatus or an information processing apparatus to execute the check target processing, wherein
the notification unit designates, as a confirmation apparatus, the image forming apparatus or the information processing apparatus that is indicated by the confirmation apparatus information associated with the check target processing with reference to the confirmation apparatus table, and notifies the user of confirmation of the result.

9. The image forming apparatus according to claim 8, further comprising a confirmation table storage unit that stores therein a confirmation table that associates the check target processing with necessity of the user confirmation, wherein
the determining unit determines whether the user confirmation is needed with reference to the confirmation table.

10. The image forming apparatus according to claim 8, further comprising a modification method table storage unit that stores therein a modification method table that associates the check target processing with a modification method, wherein
the modification unit modifies the image data with the modification method associated with the check target processing with reference to the modification method table when it is determined that the user confirmation is not needed.

11. The image forming apparatus according to claim 8, wherein:
the receiving unit receives the modification input from the image forming apparatus or the information processing apparatus that has been designated as the confirmation apparatus.

12. The image forming apparatus according to claim 8, further comprising a delivery unit that delivers the image data modified according to the workflow.

13. The image forming apparatus according to claim 12, further comprising a timer unit that counts elapsed time from when the confirmation of the result is notified, wherein
the modification unit discontinues modification of the image data if the receiving unit does not receive the modification input until the elapsed time exceeds a predetermined time period, and
the delivery unit delivers the image data of which the modification has been discontinued according to the workflow.

14. The image forming apparatus according to claim 12, wherein:
the receiving unit receives from the user a no-modification-required input indicating that modification of the result is not needed;
the modification unit discontinues modification of the image data when the receiving unit receives the no-modification-required input; and
the delivery unit delivers the image data of which the modification has been discontinued according to the workflow.

15. An image processing system, comprising:
an image forming apparatus; and
an image processing apparatus connected with the image forming apparatus through a network, wherein the image forming apparatus includes an image generation unit that reads an image so as to generate image data, and the image processing apparatus includes:

- an acquiring unit that acquires the image data;
- a workflow control unit that controls execution of a workflow in which optional processing on the image data and check processing are combined;
- a determining unit that determines whether user confirmation is needed for a result of check target processing included in the check processing in accordance with the workflow;
- a notification unit that notifies a user of confirmation of the result when it is determined that the user confirmation is needed;
- a receiving unit that receives a modification input of the result from the user;
- a modification unit that modifies the image data according to the modification input when the modification input is received and modifies the image data corresponding to the check target processing when it is determined that the user confirmation is not needed; and
- a confirmation apparatus table storage unit that stores therein a confirmation apparatus table that associates the check target processing with confirmation apparatus information indicating the image forming apparatus or an information processing apparatus to execute the check target processing, wherein the notification unit designates, as a confirmation apparatus, the image forming apparatus or the information processing apparatus that is indicated by the confirmation apparatus information associated with the check target processing with reference to the confirmation apparatus table, and notifies the user of confirmation of the result.

* * * * *